United States Patent
Lundqvist et al.

(10) Patent No.: US 7,864,813 B2
(45) Date of Patent: Jan. 4, 2011

(54) METHOD AND EQUIPMENT FOR MEASUREMENTS

(75) Inventors: Jonas Lundqvist, Espoo (FI); Kenneth Hann, Espoo (FI); Heikki Laamanen, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 61 days.

(21) Appl. No.: 12/475,985

(22) Filed: Jun. 1, 2009

(65) Prior Publication Data

US 2009/0296795 A1  Dec. 3, 2009

(30) Foreign Application Priority Data

May 30, 2008  (FI) .................................. 20085525

(51) Int. Cl.
  *H04J 3/06*  (2006.01)
(52) U.S. Cl. .................. 370/503; 370/395.21; 370/516
(58) Field of Classification Search ................ 370/235, 370/238, 301, 395.21, 395.4, 503, 508, 516–519
  See application file for complete search history.

(56) References Cited

U.S. PATENT DOCUMENTS

| | | | |
|---|---|---|---|
| 6,661,810 B1 * | 12/2003 | Skelly et al. | 370/516 |
| 2009/0109959 A1 * | 4/2009 | Elliott et al. | 370/352 |
| 2009/0233544 A1 * | 9/2009 | Oyman et al. | 455/7 |
| 2010/0040080 A1 * | 2/2010 | Um et al. | 370/437 |

FOREIGN PATENT DOCUMENTS

| | | |
|---|---|---|
| EP | 1 455 473 | 9/2004 |
| EP | 1 785 802 | 5/2007 |
| WO | 2005/020486 | 3/2005 |

OTHER PUBLICATIONS

Sue B. Moon et al., "Estimation and Removal of Clock Skew from Network Delay Measurements", in Proc. of IEEE INFOCOM'pp, New York City, NY USA, Mar. 1999, vol. 1, pp. 227-234.
Finnish Search Report dated Mar. 4, 2009, from corresponding Finnish application.

* cited by examiner

*Primary Examiner*—Phuc Tran
(74) *Attorney, Agent, or Firm*—Young & Thompson (57) ABSTRACT

The invention relates to determining a quantity to be measured from a communication system, such as a transmission delay or the phase difference of clock times. Measurement messages are transmitted (501, 502) between the two areas of the communication system in both transmission directions. Values of the time difference are calculated (503) for the measurement messages transmitted in at least one of the transmission directions, each of which values is the difference between the instant of reception measured at the reception and the instant of transmission measured at the transmission of the measurement message. The values of the time difference are used to calculate (504) an estimate of the distribution of the time difference, on the basis of which an estimate of the minimum value of the time difference is calculated (504).

27 Claims, 7 Drawing Sheets

METHOD AND EQUIPMENT FOR MEASUREMENTS

FIELD OF THE INVENTION

The invention relates to a method and equipment for determining a quantity to be measured from a communication system. The quantity to be measured may represent, for example, transmission delay or phase difference between clock times. The invention also relates to a network element of a communication system and a computer program for determining a quantity to be measured from a communication system.

BACKGROUND OF THE INVENTION

In a communication system there is often a need to perform measurements for determining the conditions and states of operation of the communication system. Measurements may be carried out for determining, for example, transmission delays between elements in a communication system and/or determining and adjusting the phase differences between clockworks of said elements. The communication system may be, for example, a geographically distributed communication network, the network elements of which represent the elements of said communication system. Said network elements may be, for example, routers, switches, hubs or base stations of a mobile communication network. Said communication system may also be a single device, such as a communication device in the operator's equipment room, which consists of units connected to each other by communication connections, which units in this case represent the elements of the communication system.

In order to illustrate the background of the invention, two areas of the communication system will be examined, each of which may represent a certain device of the communication system or an entity consisting of one or more devices. For example, let us assume that the first measurement message is sent from area 1 to area 2 at an instant when the clock time measured in area 1 is $t_{TX1}$. Said first measurement message is received in area 2 at an instant when the clock time measured in area 2 is $t_{RX2}$. The difference $t_{RX2}-t_{TX1}$ contains two components, which are the phase difference $\Psi_1$ between the clock times of areas 1 and 2 at the instant of transmission of said first measurement message and the transmission delay $D_1$ of said first measurement message from area 1 to area 2. In other words, $t_{RX2}-t_{TX1}=\Psi_1+D_1$. In the equation shown above, the transmission delay $D_1$ is assumed to be indicated as a change of the clock time measured in area 2. For example, let us assume that a second measurement message is sent from area 2 to area 1 at an instant when the clock time measured in area 2 is $t_{TX2}$. Said second measurement message is received in area 1 at an instant when the clock time measured in area 1 is $t_{RX1}$. The difference $t_{RX1}-t_{TX2}$ contains two components, which are the phase difference $\Psi_2$ between the clock times of areas 2 and 1 at the instant of transmission of said second measurement message, and the transmission delay $D_2$ of said second measurement message from area 2 to area 1. In other words, $t_{RX1}-t_{TX2}=\Psi_2+D_2$. In the equation shown above, the transmission delay $D_2$ is assumed to be indicated as a change of the clock time measured in area 1. If the transmission delays $D_1$ ja $D_2$ are equal ($D_1=D_2$) and the phase difference between the clock times of areas 1 and 2 does not change during the time between the instants of transmission of said measurement messages ($\Psi_1=-\Psi_2$), the phase difference between the clock times of areas 1 and 2 can be calculated as follows:

$$\Psi = \frac{(t_{RX2}-t_{TX1})-(t_{RX1}-t_{TX2})}{2}, \qquad (1)$$

where $\Psi=\Psi_1=-\Psi_2$. The determined phase difference between the clock times can be used for adjusting the operation of the clockworks of the communication system. With these assumptions, the data transmission delay between areas 1 and 2 can be calculated as follows:

$$D = \frac{t_{RX2}-t_{TX1}+t_{RX1}-t_{TX2}}{2}, \qquad (2)$$

where $D=D_1=D_2$. A solution according to the example shown above has been described, for example, in the technical specification IEEE1588v2 (Institute of Electrical and Electronics Engineers).

In frame switched communication systems, the measurement messages mentioned above are transferred as frames which can be, for example, IP (Internet Protocol) packages, ATM (Asynchronous Transfer Mode) frames, Ethernet frames, MPLS (Multiprotocol Label Switching) frames, Frame Relay frames or frames of some other data transfer protocol. As described above, the calculation of the phase difference of the clock times by equation (1) is based on the assumptions that the phase difference of the clock times measured in different areas does not change during the time between the instants of transmission of the measurement messages and that the transmission delays in different directions are equal. Modern clockworks are generally of so high a quality that the assumption concerning the phase difference between the clock times is generally substantially accurate. In frame switched communication systems, however, the assumption concerning the transmission delay is often not accurate enough, because the transmission delay includes a significant random-type part, and the data transfer paths routed to opposite transfer directions may be of different length. Said random-type part is, among other things, due to the queuing delays experienced by the data transmission frames in the transmission buffers and/or reception buffers of the network elements.

Publications EP 1455473 A2 and WO 2005/020486 A1 disclose a solution in which measurement and adjustment are performed only on the basis of the information represented by measurement messages that had the smallest observed transmission delay. Each measurement message that had the smallest observed transmission delay is selected from among the measurement messages received during a period of observation of a predetermined length. When the communication network is under a light load, the measurement messages that had the smallest observed transmission delay have not had to queue a significant amount of time in the transmission buffers and/or reception buffers of the network elements. In other words, said transmission buffers and/or reception buffers have been empty or nearly empty when the measurement messages that had the smallest observed transmission delay have arrived in the buffers. Therefore, the solution can be used to reduce the interfering influence of random-type queuing delays on measurement and adjustment. The more heavily loaded the communication network is, the more rare are the situations in which the transmission buffers and/or reception buffers of the network element are empty or nearly empty. When the load on the communication network increases, the smallest transmission delay of a measurement message that occurs during an observation period of a fixed length, more and more rarely is such a transmission delay that does not contain a random-type queuing delay.

In the example related to the equations (1) and (2) shown above, both the first measurement message and the second measurement message must be among the measurement messages that experienced as small a transmission delay as possible. For the purpose that the first measurement message would represent a measurement message that experienced a sufficiently small transmission delay, it is often necessary to transmit a large number of measurement messages and to select the measurement message for which the difference between the instants of reception and transmission is the smallest as the first measurement message. Similarly, for the purpose that the second measurement message would represent a measurement message that experienced a sufficiently small transmission delay, it is often necessary to transmit a large number of measurement messages and to select the measurement message for which the difference between the instants of reception and transmission is the smallest as the second measurement message. The large number of measurement messages required makes the measurement and possible adjustment based on the measurement slow and also stresses the communication system. On the other hand, compromising on the number of measurement messages reduces the accuracy of the measurement and possible adjustment based on it.

SUMMARY OF THE INVENTION

The invention relates to a new kind of method for determining a quantity to be measured from a communication system. The quantity to be measured may represent, for example, transmission delay or phase difference between clock times. The method according to the invention includes the following steps:

sending first measurement messages from the first area of said communication system to the second area of said communication system, and sending a second measurement message from said second area to said first area, calculating the values of the time difference for the first measurement messages, the value of said time difference relating to each first measurement message being essentially the difference between the instant of reception measured in said second area and the instant of transmission measured in said first area for the measurement message in question, classifying said values of the time difference into ranges of values having predetermined lower and upper limits, calculating for each range of values an occurrence frequency indicator, which is proportional to the number of values of said time difference that belong to said range of values, fitting a curve to the occurrence frequency indicators of said ranges of values, and determining on the basis of said curve an estimate of the minimum value of said time difference, and determining said quantity to be measured on the basis of the estimate of the minimum value of said time difference and the information related to the second measurement message, said information being based on the instant of transmission measured in said second area and the instant of reception measured in said first area for said second measurement message.

Said occurrence frequency indicators constitute an estimate of the distribution of said time difference, from which the estimate of the minimum value of the time difference is determined by curve fitting. The curve may be, for example, a first degree polynome (straight line) or a polynome of the second or higher degree. The estimate of the minimum value of the time difference determined from the estimate of the distribution of the time difference does not necessarily correspond to the difference between the instants of reception and transmission of any one of said first measurement messages. Said estimate of the minimum value of the time difference is an approximate value for the difference between the instants of reception and transmission which would be obtained in a situation when the transmission delay from the first area of said communication system to the second area of said communication system is the smallest possible. Thus it is not necessary to transmit such a large number of first measurement messages that at least one of them would have experienced a sufficiently small transmission delay. Thereby it is possible to reduce the number of measurement messages compared to the prior art solution described earlier in this document.

In a situation where the transmission direction of the communication system from said second area to said first area is lightly loaded, it is often sufficient to have only one (second) measurement message, which is sent from said second area to said first area. When the communication system is loaded asymmetrically, the method described above is preferably applied in such a way that the transmission direction, which is under a heavier load, is selected as the transmission direction from said first area to said second area. On the other hand, it is also possible that a plurality of measurement messages are transmitted in both transmission directions. In that case, the procedure based on the distribution estimate described above can be applied in both transmission directions, or alternatively, a procedure in which the measurement message having the smallest difference between the instants of reception and transmission is selected can be applied in one transmission direction.

The invention also relates to new kind of equipment for determining a quantity to be measured from a communication system. The equipment according to the invention has a processor system, which is arranged:

to calculate the values of the time difference for the first measurement messages, which have been sent from the first area of said communication system to the second area of said communication system, the value of said time difference related to each first measurement message being essentially the difference between the instant of reception measured in said second area and the instant of transmission measured in said first area for the measurement message in question, to classify said values of the time difference into ranges of values having predetermined lower and upper limits, to calculate for each range of values an occurrence frequency indicator, which is proportional to the number of values of said time difference that belong to said range of values, to fit a curve to the occurrence frequency indicators of said ranges of values, to determine on the basis of said curve an estimate of the minimum value of said time difference, and to determine said quantity to be measured on the basis of an estimate of the minimum value of said time difference and the information related to the second measurement message, which said second measurement message has been sent from said second area to said first area, and which said information is based on the instant of transmission measured in said second area and the instant of reception measured in said first area for said second measurement message.

The invention also relates to a new kind of network element, which includes:
- a transmitter for transmitting digital data to a communication system,
- a receiver for receiving digital data from said communication system, and
- equipment according to the invention for determining the quantity to be measured from said communication system.

The invention also relates to a new kind of computer program for determining a quantity to be measured from a communication system. The computer program according to the invention includes instructions executable by a programmable processor:

for instructing the programmable processor to calculate the values of the time difference for the first measurement messages, which have been sent from the first area of said communication system to the second area of said communication system, the value of said time difference related to each first measurement message being essentially the difference between the instant of reception measured in said second area and the instant of transmission measured in said first area for the measurement message in question, for instructing said programmable processor to classify said values of the time difference into ranges of values having predetermined lower and upper limits, for instructing said programmable processor to calculate for each range of values an occurrence frequency indicator, which is proportional to the number of values of said time difference that belong to said range of values, for instructing said programmable processor to fit a curve to the occurrence frequency indicators of said ranges of values, for instructing said programmable processor to determine an estimate of the minimum value of said time difference on the basis of said curve, and for instructing said programmable processor to determine said quantity to be measured on the basis of an estimate of the minimum value of said time difference and the information related to the second measurement message, which said second measurement message has been sent from said second area to said first area, and which said information is based on the instant of transmission measured in said second area and the instant of reception measured in said first area for said second measurement message.

The various embodiments of the invention are characterized in what is set forth in the dependent claims.

SHORT DESCRIPTION OF THE DRAWINGS

The embodiments and advantages of the invention will be described in more detail in the following, with reference to the embodiments presented as examples and the accompanying figures, in which.

DESCRIPTION OF THE EMBODIMENTS OF THE INVENTION

Figure 1:
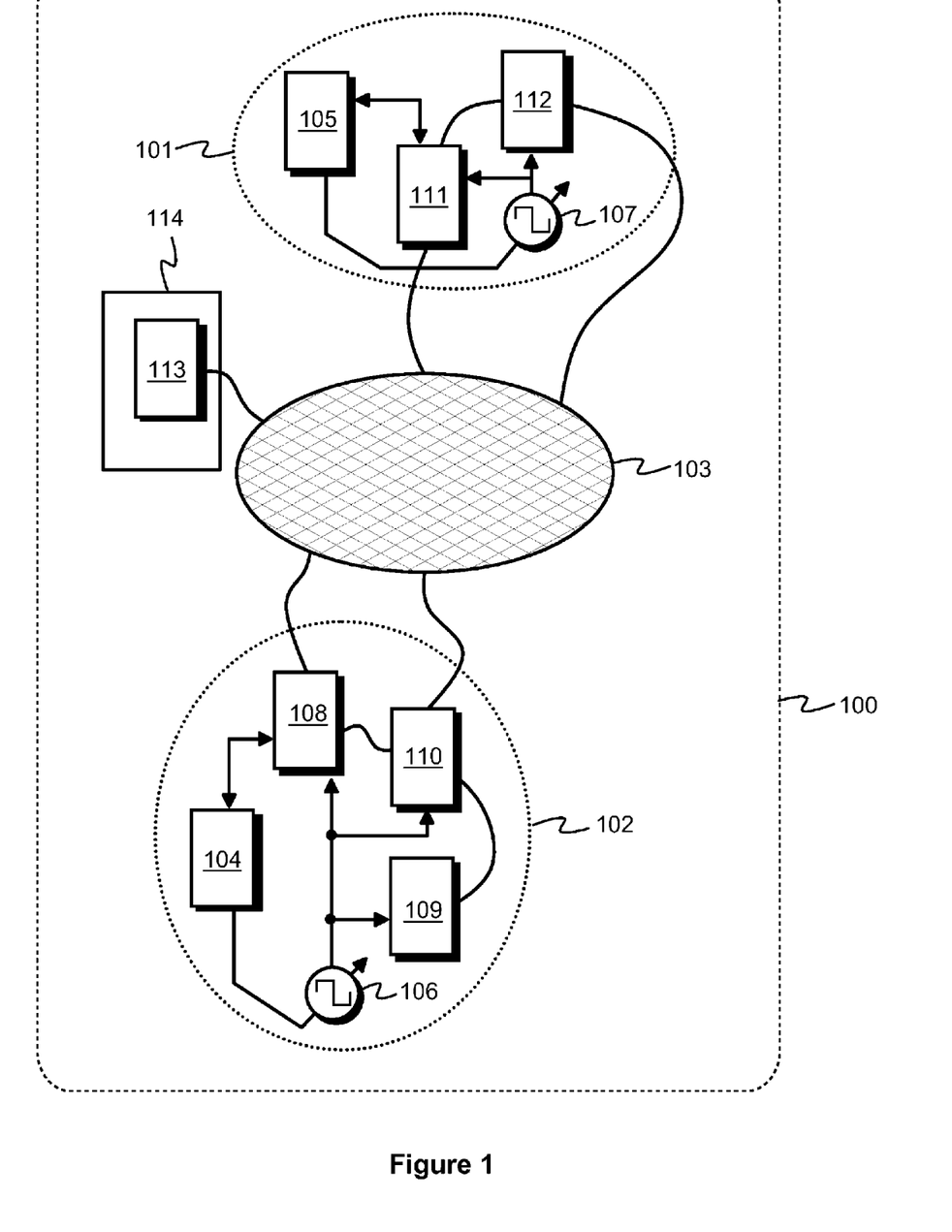
FIG. 1 shows a communication system, to which the equipment according to an embodiment of the invention is connected for determining a quantity to be measured from said communication system.

FIG. 1 shows an example of a communication system 100, to which the equipment according to an embodiment of the invention has been connected for determining a quantity to be measured from said communication system. The quantity to be measured may represent, for example, the transmission delay between different parts of a communication system or the phase difference of clock times in different parts of the communication system. The first area 101 of the communication system includes the elements 112 and 111, which have been arranged to use the first clock time produced by the first clockwork 107. The second area 102 of the communication system includes the elements 108, 109 and 110, which have been arranged to use the second clock time produced by the second clockwork 106. The cross-hatched ellipse 103 represents the other parts of the communication system. The communication system 100 may be a geographically distributed communication network, for example. Then the elements 108 to 112 can be network elements of the communication network, such as routers, switches, hubs or base stations of a mobile phone network. It is also possible that the area 101 represents a single network element, such as a router, switch, hub or base station of a mobile phone network. Similarly, the area 102 may represent a single network element. The communication system 100 may also be a single device, such as a communication device in the operator's equipment room, which consists of units connected to each other by communication connections, which units in this case represent the elements 108 to 112 of the communication system.

The equipment for determining a quantity to be measured from the communication system includes a processor system, which includes one or more of the processors 104, 105 and 113 in the embodiment of the invention illustrated in FIG. 1. In more general terms, the processor system may include processors located in different places in the communication system, or the processor system may consist of one or more processors located centrally.

Figure 2:
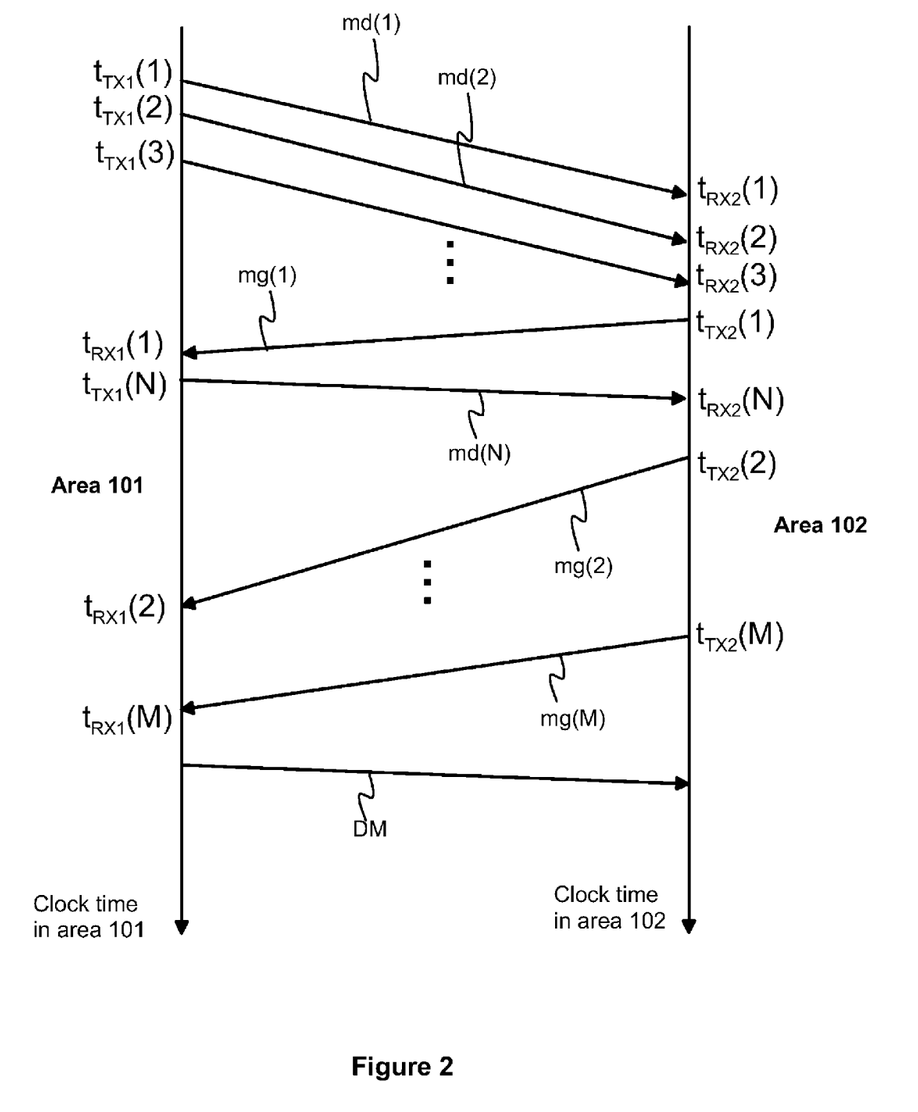
FIG. 2 is a messaging diagram, which illustrates the operation of equipment according to some embodiments of the invention in a situation presented by way of example in a communication system shown in FIG. 1, FIGS. 3a and 3b illustrate the determination of an estimate of the minimum value of the time difference from an estimate of the distribution of the time difference by means of curve fitting in equipment according to some embodiments of the invention.

FIG. 2 is a messaging diagram, which illustrates the operation of equipment according to some embodiments of the invention in a situation presented as an example in a communication system shown in FIG. 1. A plurality of first measurement messages md(1), ..., md(N) are sent from area 101 (FIG. 1) to area 102, and their instants of transmission measured in area 101 are $t_{TX1}(1), \ldots, t_{TX1}(N)$, and the instants of reception measured in area 102 are $t_{RX2}(1), \ldots, t_{RX2}(N)$. A second measurement message mg(1) is sent from area 102 to area 101, and possibly one or more third measurement messages mg(2), ..., mg(M), for which the instants of transmission measured in area 102 are $t_{TX2}(1), \ldots, t_{TX2}(M)$, and the instants of reception measured in area 101 are $t_{RX1}(1), \ldots,$ $t_{RX1}(M)$. The numbers N and M of measurement messages transferred in different transmission directions may be equal or different.

The communication system 100 may be a frame switched communication system, in which the measurement messages mentioned above are transmitted in data transmission frames. The data transmission frames may be, for instance, IP (Internet Protocol) packages, ATM (Asynchronous Transfer Mode) frames, Ethernet frames, MPLS (Multiprotocol Label Switching) frames, Frame Relay frames or frames of some other data transfer protocol. The communication system 100 may also be a time-slot switched communication system, in which said measurement messages may be, for example, bit sequences with a predetermined bit pattern.

Said processor system is arranged to calculate the values of the time difference E1 for said first measurement messages $md(1), \ldots, md(N)$. The value E1(i) of said time difference E1 related to each measurement message $md(i)$ ($i=1, 2, \ldots, N$) is essentially the difference between the instant of reception $t_{RX2}(i)$ measured in area 102 and the instant of transmission $t_{TX1}(i)$ measured in area 101 for the measurement message $md(i)$, i.e. $E1(i)=t_{RX2}(i)-t_{TX1}(i)$. Said instant of transmission has been measured according to the clock time produced by the clockwork 107, and said instant of reception has been measured according to the clock time produced by the clockwork 106. The processor system is arranged to calculate, on the basis of the values of the time difference, an estimate $E1_{min}$ of the minimum value of said time difference.

Figure 3A:
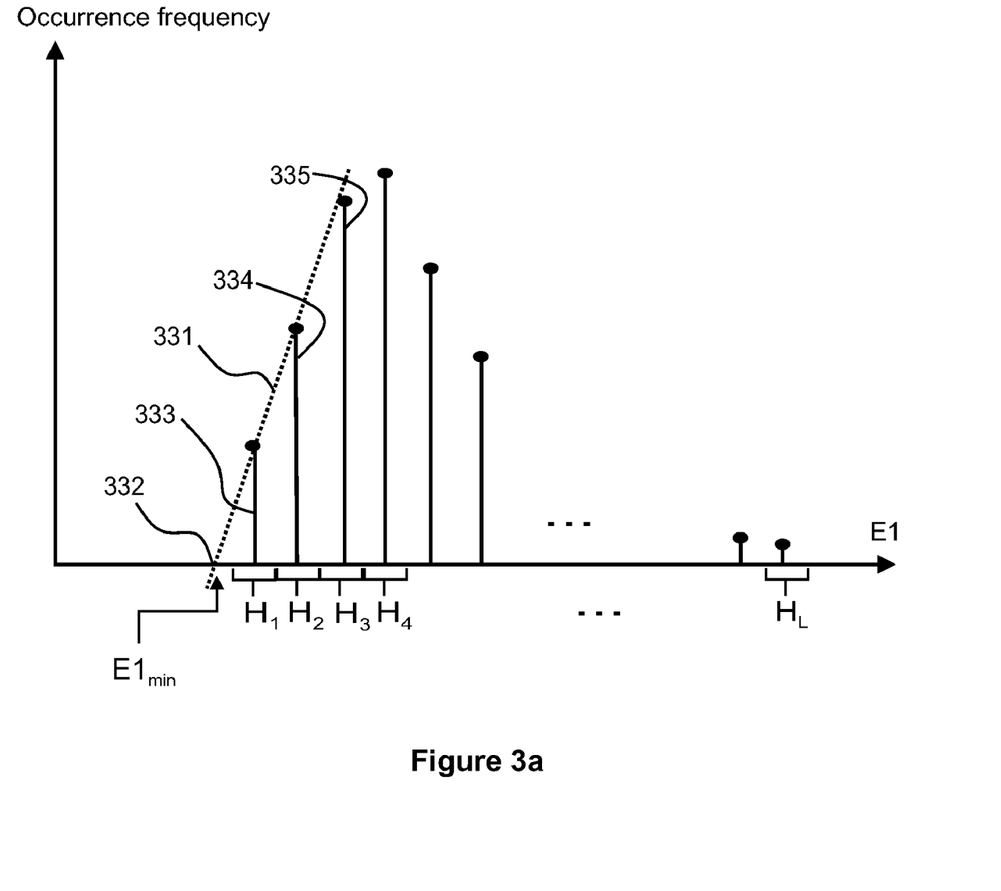

FIG. 3a illustrates the determination of the estimate $E1_{min}$ of the minimum value of said time difference. Said processor system is arranged to classify the values of the time difference $E1(i)$ ($i=1, 2, \ldots, N$) into ranges of values $H_n$ ($n=1, 2, \ldots, L$) with predetermined lower and upper limits $Ha_n$, and $Ha_{n+1}$, and to form for each range of values an occurrence frequency indicator, which is proportional to the number of values of the time difference belonging to the range of values. The ranges of values need not be of equal length. The occurrence frequency indicators of different ranges of values (such as 333, 334 and 335) constitute an estimate of the distribution of the time difference E1. Said processor system is arranged to fit a curve 331 to the occurrence frequency indicators of said ranges of values. In the example shown in FIG. 3a, the curve is fitted to the occurrence frequency indicators of the ranges of values representing the lower part of the range of variation of said time difference. The curve 331 may be, for example, a polynome, which can be fitted to the values of the occurrence frequency indicators by the least squares method, for example. Said processor system is arranged to specify the value of the time difference E1 corresponding to the zero point 332 of the curve 331 as the estimate of the minimum value of the time difference, $E1_{min}$. The estimate of the minimum value of the time difference $E1_{min}$ determined from the estimate of the distribution of the time difference does not necessarily correspond to the difference between the instants of reception and transmission of any one of the measurement messages $md(1), \ldots, md(N)$. The estimate of the minimum value of the time difference $E1_{min}$ determined from the estimate of the distribution of the time difference is an approximate value for the difference between the instants of reception and transmission, which would be obtained in a situation in which the transmission delay from area 101 to area 102 is the smallest possible.

In the equipment according to an embodiment of the invention, said processor system is arranged to use a part of the graph of function F as said curve, the expression of the function F containing settable parameters, and the function F having the following properties (a) and (b):

(a) there is a real number x0, by which said function F and the derivative F' of said function are both zeros, and the value of which depends on at least one of the settable parameters, and (b) there is a real number x1>x0, by which said derivative F' and the second derivative F'' of said function are both positive in an open range from x0 to x1.

Figure 3B:
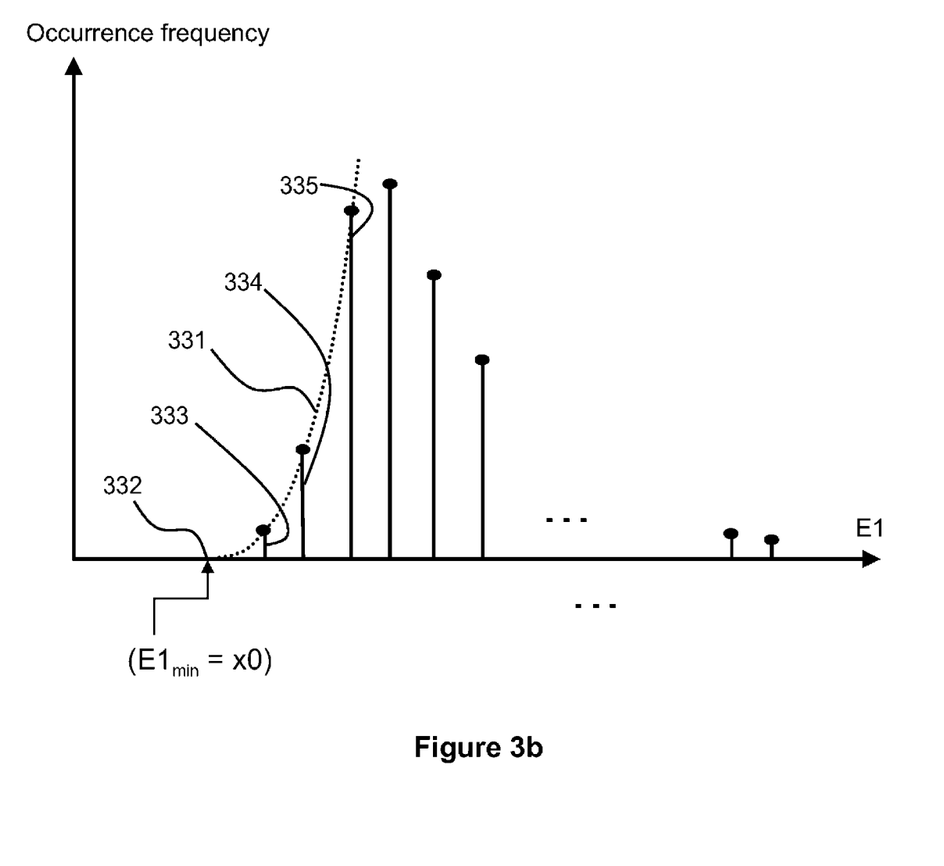

Said function F may be, for example, of the form $F(x)=A\times(x\times B)^n$, where n (=2), A and B being said settable parameters. Then said real number x0, by which $F(x0)=F'(x0)=0$, is B. FIG. 3b illustrates the determination of the estimate $E1_{min}$ of the minimum value of said time difference. Curve 331 represents a part of the graph of function F. From FIG. 3b it is seen that a function having the above mentioned properties (a) and (b) can be used to model the phenomenon occurring especially in heavily loaded communication systems, in which the minimum value of the time difference seldom occurs. The rareness of the occurrence of the minimum value of the time difference is indicated by the fact that the derivative of the density function of the time difference with regard to the time difference is very small near the minimum value of the time difference. Said processor system is arranged to determine the values of said settable parameters on the basis of said occurrence frequency indicators of the ranges of values (such as 333, 334 and 335) and to set said x0, which corresponds to the zero point 332 of the curve 331, as said estimate of the minimum value of the time difference $E1_{min}$. The values of said settable parameters can be determined by the least squares method, for example.

Said processor system is arranged to determine the quantity to be measured from the communication system 100 on the basis of the estimate of the minimum value of said time difference $E1_{min}$ and the information related to the second measurement message mg(1) (FIG. 2). Said information is based on the instant of transmission $t_{TX2}(1)$ measured in area 102 and the instant of reception $t_{RX1}(1)$ measured in area 101 for the measurement message mg(1). Some exemplary ways of determining the quantity to be measured will be presented hereinafter.

In the equipment according to an embodiment of the invention, said processor system is arranged to determine the transmission delay D between area 101 (FIG. 1) and area 102, which in this case represents the quantity to be measured from the communication system 100. Said processor system is arranged to determine said transmission delay D by the equation:

$$D = \frac{E1_{min} + t_{RX1}(1) - t_{TX2}(1)}{2}, \quad (3)$$

where $t_{TX2}(1)$ ja $t_{RX1}(1)$ are the instant of transmission measured in area 102 and the instant of reception measured in area 101 for the second measurement message mg(1) (FIG. 2). $E1_{min}$ is an estimate for the minimum value of the time difference $t_{RX2}-t_{TX1}$, and thus equation (3) corresponds to equation (2), which was presented earlier in this document.

In the equipment according to an embodiment of the invention, said processor system is arranged to determine the phase difference Ψ between the clock times of area 101 (FIG. 1) and area 102, which in this case represents the quantity to be measured from the communication system 100. Said processor system is arranged to determine said phase difference Ψ by the equation:

$$\Psi = \frac{E1_{min} - (t_{RX1}(1) - t_{TX2}(1))}{2}, \quad (4)$$

where $t_{TX2}(1)$ ja $t_{RX1}(1)$ are the instant of transmission measured in area 102 and the instant of reception measured in area 101 for the second measurement message mg(1) (FIG. 2). $E1_{min}$ is an estimate for the minimum value of the time difference $t_{RX2}-t_{TX1}$, and thus equation (4) corresponds to equation (1), which was presented earlier in this document.

In the equipment according to an embodiment of the invention, said processor system is arranged to calculate the values of the second time difference E2 for said second measurement message mg(1) (FIG. 2) and at least for one third measurement message mg(2), ..., mg(M). The value E2(j) of said second time difference E2 related to each measurement message mg(j) (j=1, 2, ..., M) is essentially the difference between the instant of reception $t_{RX1}(i)$ measured in area 101 and the instant of transmission $t_{TX2}(j)$ measured in area 102 for the measurement message mg(j), i.e. $E2(j)=t_{RX1}(j)-t_{TX2}(j)$. Said instant of transmission has been measured according to the clock time produced by the clockwork 106, and said instant of reception has been measured according to the clock time produced by the clockwork 107. The processor system is arranged to calculate, on the basis of said values of the second time difference, an estimate $E2_{min}$ of the minimum value of said second time difference. Said processor system may be, for example, arranged to select the smallest of said values of the second time difference and to use the selected smallest value of the second time difference as said estimate of the minimum value of the second time difference, $E2_{min}$, or said processor system may be arranged to calculate an estimate of the distribution of said second time difference E2 and to determine an estimate $E2_{min}$ of the minimum value of the second time difference from the estimate of said distribution according to what has been described with reference to FIG. 3a and/or 3b. Said processor system is arranged to determine the quantity to be measured from the communication system 100 on the basis of the estimate of the minimum value of said time difference $E1_{min}$ and the estimate of the minimum value of said second time difference $E2_{min}$. Some exemplary ways of determining the quantity to be measured will be presented hereinafter.

In the equipment according to an embodiment of the invention, said processor system is arranged to determine the transmission delay D between area 101 (FIG. 1) and area 102 by the equation:

$$D = \frac{E1_{min} + E2_{min}}{2}. \quad (5)$$

$E1_{min}$ is an estimate for the minimum value of the time difference $t_{RX2}-t_{TX1}$, and $E2_{min}$ is an estimate for the minimum value of the time difference $t_{RX1}-t_{TX2}$, and thus equation (5) corresponds to equation (2), which was presented earlier in this document.

In the equipment according to an embodiment of the invention, said processor system is arranged to determine the phase difference $\Psi$ between the clock times of area 101 (FIG. 1) and area 102 by the equation:

$$\Psi = \frac{E1_{min} - E2_{min}}{2}. \quad (6)$$

$E1_{min}$ is an estimate for the minimum value of the time difference $t_{RX2}-t_{TX1}$, and $E2_{min}$ is an estimate for the minimum value of the time difference $t_{RX1}-t_{TX2}$, and thus equation (6) corresponds to equation (1), which was presented earlier in this document.

In the equipment according to an embodiment of the invention, said processor system is arranged to adjust the clockwork 106 and/or the clockwork 107 on the basis of a quantity measured from the communication network, which is preferably said phase difference $\Psi$.

The operations of the equipment according to the embodiment of the invention can be distributed in many different ways, or said operations can be performed in a centralized manner. It is possible, for example, to transfer the instants of transmission and reception of the measurement messages $t_{TX1}(1), \ldots, t_{TX1}(N), t_{TX2}(1), \ldots, t_{TX2}(M), t_{RX1}(1), \ldots, t_{RX1}(M), t_{RX2}(1), \ldots, t_{RX2}(N)$ (FIG. 2) from areas 101 and 102 to a unit 114 located outside said areas, which unit contains a processor system according to the embodiment of the invention for determining the quantity to be measured from the communication system. The processor system located in the unit 114 may consist of one processor 113 or a number of processors connected together. It is also possible that the instants of reception $t_{RX2}(1), \ldots, t_{RX2}(N)$ and instants of transmission $t_{TX2}(1), \ldots, t_{TX2}(M)$ (FIG. 2) measured in area 102 are transferred to area 101, which contains the processor system according to the embodiment of the invention. The processor system located in area 101 may consist of one processor 105 or a number of processors connected together. It is also possible that the instants of reception $t_{RX1}(1), \ldots, t_{RX1}(M)$ and instants of transmission $t_{TX1}(1), \ldots, t_{TX1}(N)$ (FIG. 2) measured in area 101 are transferred to area 102, which contains the processor system according to the embodiment of the invention. The processor system located in area 102 may consist of one processor 104 or a number of processors connected together.

In the equipment according to an embodiment of the invention, said processor system includes a processor 105 located in area 101 and a processor 104 located in area 102. The processor 104 is arranged to read from each received measurement message md(i) (i=1, ..., N) the instant of transmission $t_{TX1}(i)$ measured in area 101. It is thus assumed that the processor 105 or the communication system 100 is arranged to include the instant of transmission $t_{TX1}(i)$ of the measurement message in question in each measurement message md(i). The processor 104 is arranged to calculate the value of the time difference for each received measurement message md(i) and to calculate the estimate of the minimum value of the time difference $E1_{min}$. The processor 105 is arranged to instruct the element 111 (or 112) to transmit the instant of reception $t_{RX1}(1)$ measured in area 101 for the received measurement message mg(1) to area 102. The data message DM shown in FIG. 2 depicts the transfer of information indicating said instant of reception $t_{RX1}(1)$ from area 101 to area 102. The processor 104 is arranged to determine the quantity to be measured from the communication system on the basis of the estimate of the minimum value of said time difference $E1_{min}$ and the instants of transmission and reception, $t_{TX2}(1)$ and $t_{RX1}(1)$, of the measurement message mg(1) according to equation (3) and/or equation (4), for example. The processor 104 may also be arranged to adjust the clockwork 106 on the basis of said quantity to be measured. In such a situation, the clockwork 107 may function as the master clock, and the clockwork 106 may function as the slave clock, whereby the clock time produced by the slave is synchronized to the clock time produced by the clockwork 107.

In the equipment according to an embodiment of the invention, said processor system includes a processor 105 located in area 101 and a processor 104 located in area 102. The processor 105 is arranged to read from each received measurement message md(i) (i=1, . . . , N) the instant of transmission $t_{TX1}(i)$ measured in area 101. Similarly, the processor 104 is arranged to read from each received measurement message mg(j) (j=1, . . . , M) the instant of transmission $t_{TX2}(j)$ measured in area 102. Thus it is assumed that the processors 104 and 105 or the communication system 100 are arranged to write in each measurement message the instant of transmission of the measurement message, which has been measured at the location of transmission of the measurement message in question. The processor 104 is arranged to calculate the value of the time difference for each received measurement message md(i) and to calculate the estimate of the minimum value of the time difference $E1_{min}$. Similarly, the processor 105 is arranged to calculate the value of the second time difference for each received measurement message mg(j) and to calculate the estimate of the minimum value of the second time difference $E2_{min}$. The processor 105 is arranged to instruct the element 111 (or 112) to transmit said estimate of the minimum value of the second time difference $E2_{min}$ to area 102. The processor 104 is arranged to determine the quantity to be measured from the communication system on the basis of the estimate $E1_{min}$ of the minimum value of said time difference and the estimate $E1_{min}$ of the minimum value of said second time difference according to equation (5) and/or equation (6), for example. The processor 104 may also be arranged to adjust the clockwork 106 on the basis of said quantity to be measured.

Figure 4:
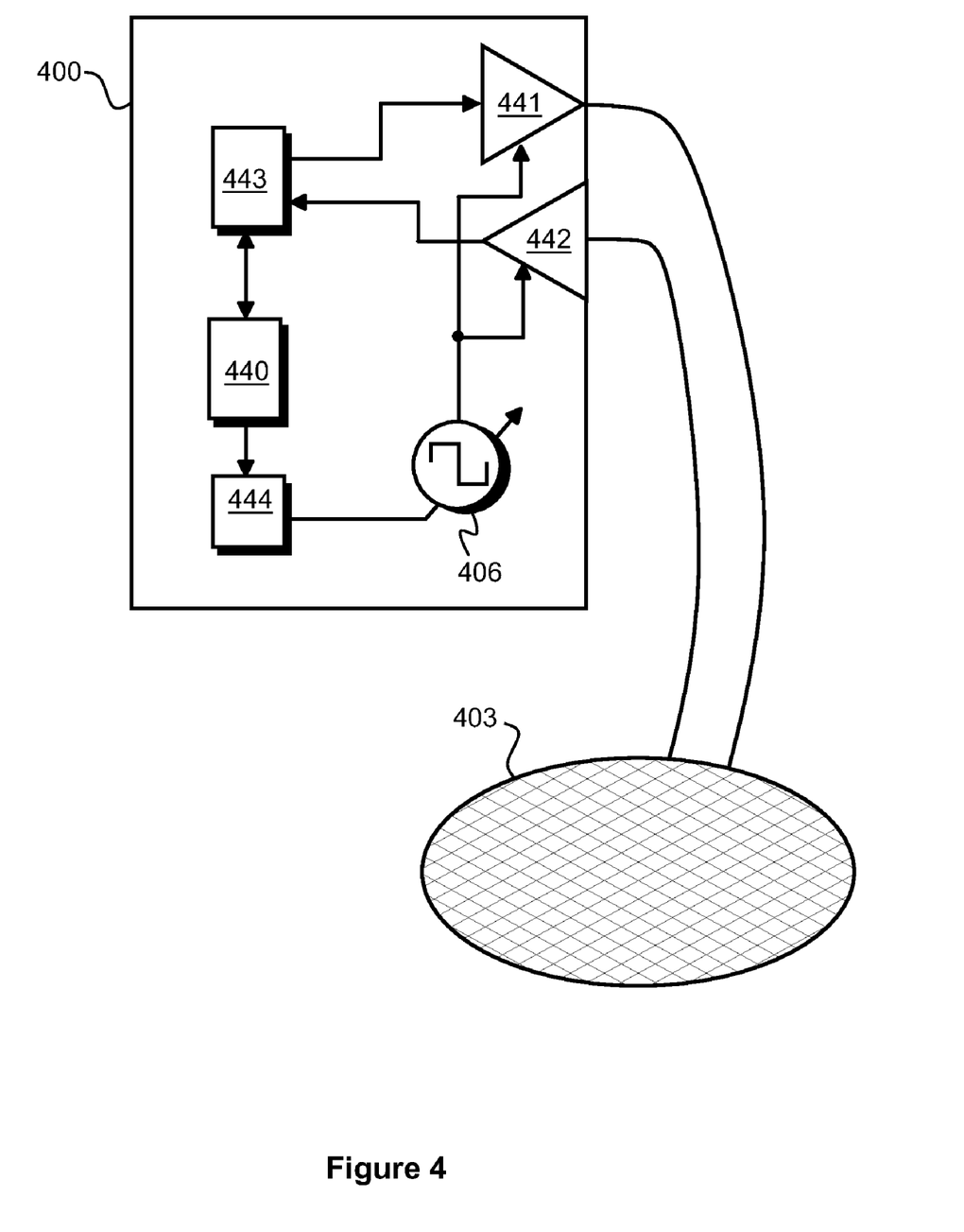
FIG. 4 shows a network element according to an embodiment of the invention.

FIG. 4 shows a network element 400 according to an embodiment of the invention, which may be, for example, an IP (Internet Protocol) router, an MPLS (Multiprotocol Label Switching) switch, an ATM (Asynchronous Transfer Mode) switch, an Ethernet switch or a combination of one or more of those mentioned above. The network element includes a transmitter 441 for transmitting digital data to the communication system 403, and a receiver 442 for receiving digital data from said communication system. The network element includes the equipment 440 according to the embodiment of the invention for determining the quantity to be measured. The quantity to be measured may represent, for example, data transmission delay between the network element and a second network element belonging to the communication system 403, or the phase difference between the clock times of the network element and said second network element. The equipment 440 includes a processor system that consists of one or more processors. Said processor system is arranged to calculate the values of the time difference for measurement messages, which have been received in the network element. The value of said time difference related to each measurement message is essentially the difference between the instant of reception measured in the network element and the instant of transmission measured in the communication system 403 for the measurement message in question. The receiver 442 is arranged to receive the data that indicate the instants of transmission of the measurement messages received in the network element. The unit 443 is arranged to read said instants of transmission from the received data. For example, each received measurement message may include information that indicates the instant of transmission of the measurement message in question. Said processor system is arranged:

to classify said values of the time difference into ranges of values having predetermined lower and upper limits, to calculate for each range of values an occurrence frequency indicator (333, 334, 335 in FIGS. 3a and 3b), which is proportional to the number of values of said time difference that belong to said range of values, to fit a curve (331 in FIGS. 3a and 3b) to the occurrence frequency indicators of said ranges of values, and to determine on the basis of said curve an estimate of the minimum value of said time difference.

Said processor system is arranged to determine said quantity to be measured on the basis of an estimate of the minimum value of said time difference and the information related to one or more measurement message(s) transmitted from the network element. Said information is based on the instant of transmission measured in the network element and the instant of reception measured in the communication system 403 for one or more transmitted measurement message(s). The receiver 442 is arranged to receive information related to said instant of reception, and the unit 443 is arranged to read said information from the received data.

In a network element according to an embodiment of the invention, the receiver 442 is arranged to receive the information that indicates the instants of reception measured in the communication system 403 for the measurement messages transmitted from the network element, and the unit 443 is arranged to read said instants of reception from the received data. The processor system of the equipment 440 is arranged to calculate the values of the second time difference for at least two measurement messages transmitted from the network element. The value of said second time difference related to each transmitted measurement message is essentially the difference between the instant of reception measured in the communication system 403 and the instant of transmission measured in the network element for the measurement message in question. The processor system is arranged to calculate, on the basis of said values of the second time difference, an estimate of the minimum value of said second time difference. Said processor system is arranged to determine the quantity to be measured on the basis of the estimate of the minimum value of said time difference and the estimate of the minimum value of said second time difference.

In the network element according to an embodiment of the invention, the receiver 442 is arranged to receive an estimate of the minimum value of the second time difference, which has been calculated for the measurement messages transmitted from the network element, and the unit 443 is arranged to read said estimate of the minimum value of the second time difference from the received data. The processor system of the equipment 440 is arranged to determine said quantity to be measured on the basis of the estimate of the minimum value of said time difference and the estimate of the minimum value of said second time difference.

The network element according to an embodiment of the invention includes an adjustment unit 444, which is arranged to adjust the clockwork 406 in the network element on the basis of said quantity to be measured.

In the network element according to an embodiment of the invention, the transmitter 441 is arranged to transmit data transmission frames to the communication system 403, the receiver 442 is arranged to receive data transmission frames from the communication system, and the unit 443 is arranged to read from the received data transmission frame the instant of transmission measured for the data transmission frame in the communication system 403.

Figure 5:
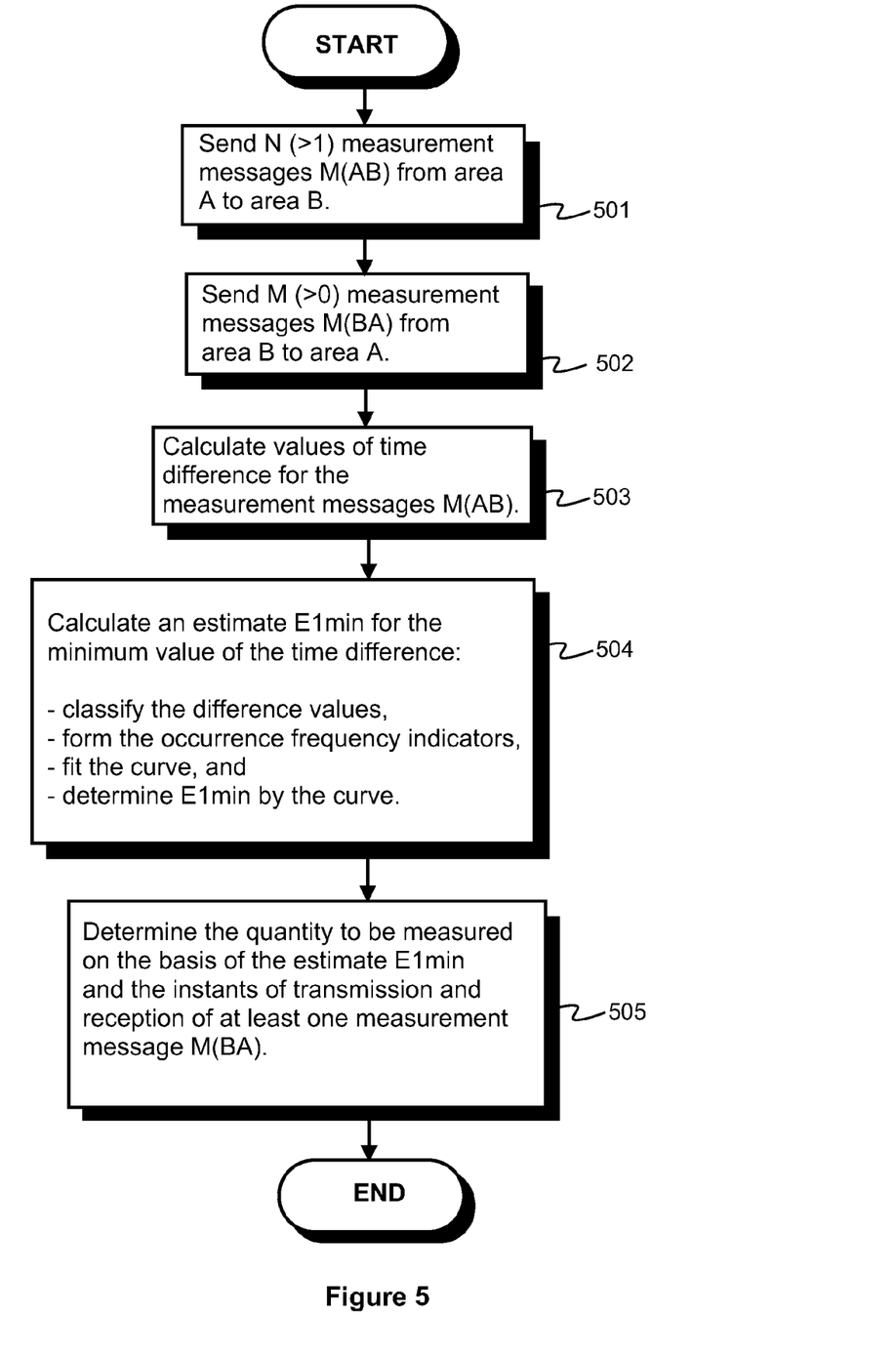
FIG. 5 is a flow chart of a method according to an embodiment of the invention for determining a quantity to be measured from the communication system.

FIG. 5 is a flow chart of a method according to an embodiment of the invention for determining a quantity to be measured from the communication system. The quantity to be measured may represent, for example, data transmission delay or phase difference between clock times. In step 501, the first measurement messages M(AB) are transmitted from the first area A of said communication system to the second area B of said communication system. In step 502, the second measurement message M(BA) is transmitted from said second area B to said first area A. In step 503, the values of the time difference are calculated for said first measurement messages M(AB). The value of said time difference relating to each measurement message is essentially the difference between the instant of reception measured in said second area B and the instant of transmission measured in the first area A for the measurement message in question. In step 504, an estimate $E1_{min}$ of the minimum value of said time difference is calculated on the basis of said values of the time difference as follows:

- classifying said values of the time difference into ranges of values having predetermined lower and upper limits,
- calculating for each range of values an occurrence frequency indicator (333, 334, 335 in FIGS. 3a ja 3b), which is proportional to the number of values of said time difference that belong to said range of values,
- fitting a curve (331 in FIGS. 3a ja 3b) to the occurrence frequency indicators of said ranges of values, and
- determining as said estimate of the minimum value of the time difference $E1_{min}$ the value of said time difference that corresponds to the zero point of said curve (332 in FIGS. 3a and 3b).

In step 505, said quantity to be measured is determined on the basis of the estimate of the minimum value of said time difference $E1_{min}$ and the information related to said second measurement message M(BA), said information being based on the instant of transmission measured in said second region B and the instant of reception measured in said first region A for said second measurement message.

In a method according to an embodiment of the invention, said curve is a part of the graph of function F, which is preferably a function of one variable, the expression of function F containing settable parameters, and function F having the following properties:

- there is a real number x0, by which said function F and the derivative F' of said function are both zeros, and the value of which depends on at least one of said settable parameters, and
- there is a real number x1>x0, by which said derivative F' and the second derivative F'' of said function are both positive in an open range from x0 to x1.

The values of said settable parameters are determined on the basis of the occurrence frequency indicators of said ranges of values, and said x0 is set as said estimate of the minimum value of the time difference $E1_{min}$. The values of said settable parameters can be determined by the least squares method, for example.

Figure 6:
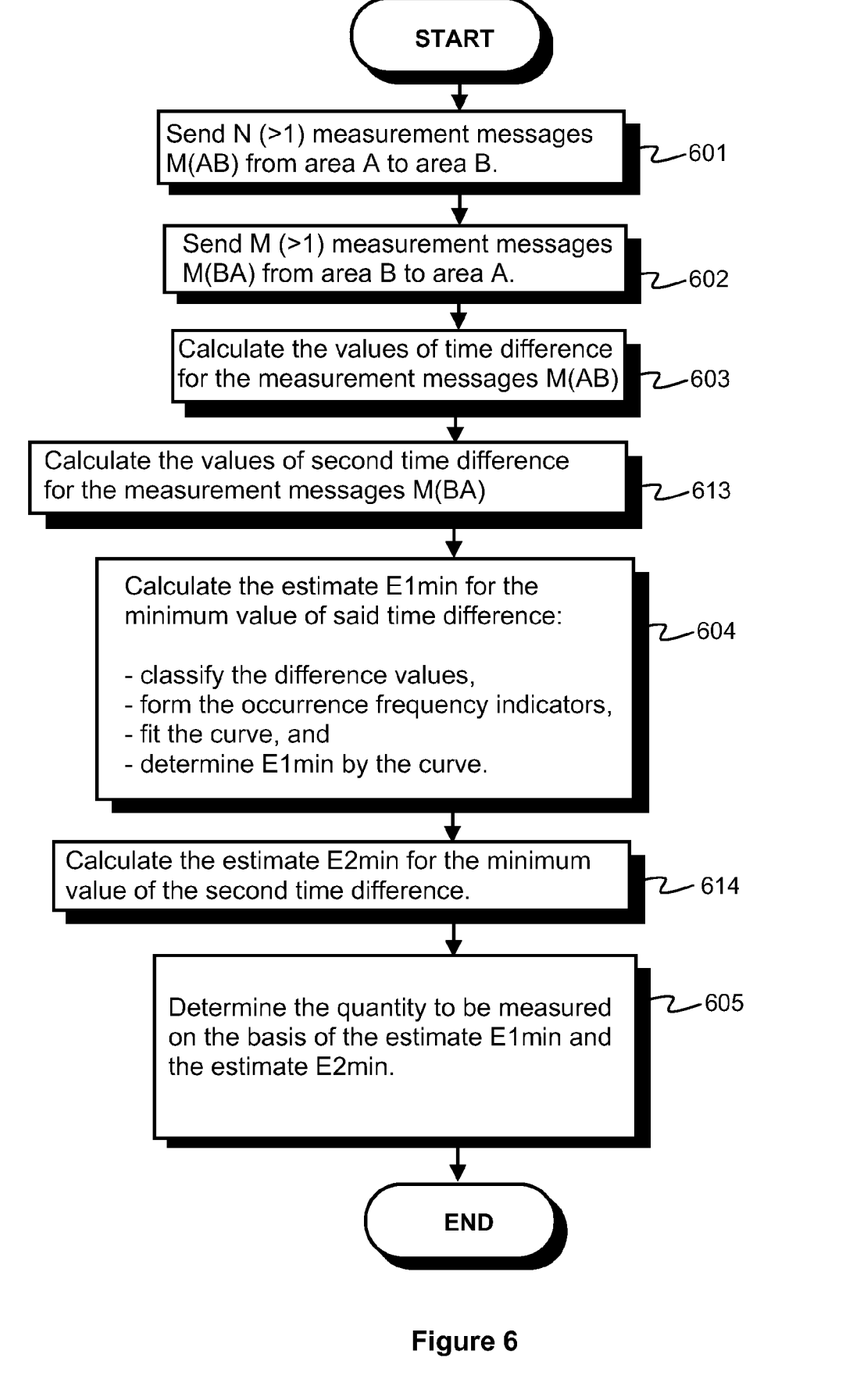
FIG. 6 is a flow chart of a method according to an embodiment of the invention for determining a quantity to be measured from the communication system.

FIG. 6 is a flow chart of a method according to another embodiment of the invention for determining a quantity to be measured from the communication system. In step 601, the first measurement messages M(AB) are transmitted from the first area A of said communication system to the second area B of said communication system. In step 602, a second measurement message and at least one third measurement message M(BA) are transmitted from said second area B to said first area A. In step 603, the values of the time difference are calculated for said first measurement messages M(AB). The value of said time difference relating to each measurement message is essentially the difference between the instant of reception measured in said second area B and the instant of transmission measured in the first area A for the measurement message in question. In step 613, the values of the second time difference are calculated for said second measurement message and at least one third measurement message M(BA). The value of said second time difference relating to each measurement message is essentially the difference between the instant of reception measured in said first area A and the instant of transmission measured in the second area B for the measurement message in question. In step 604, an estimate $E1_{min}$ of the minimum value of said time difference is calculated on the basis of said values of the time difference. In step 614, an estimate $E2_{min}$ of the minimum value of said second time difference is calculated on the basis of said values of the second time difference. In step 605, said quantity to be measured is determined on the basis of an estimate of the minimum value of said time difference $E1_{min}$ and an estimate of the minimum value of said second time difference $E2_{min}$.

In the method according to an embodiment of the invention, said quantity to be measured is the transmission delay D between said first area and said second area, and said quantity to be measured is determined by the equation:

$$D = \frac{E1_{min} + t_{RX1} - t_{TX2}}{2},$$

where $E1_{min}$ is an estimate of the minimum value of said time difference, and $t_{TX2}$ and $t_{RX1}$, are the instant of transmission measured in said second area B and the instant of reception measured in said first area A for said second measurement message.

In the method according to an embodiment of the invention, said quantity to be measured is the phase difference Ψ between the clock times of said first area and said second area, and said quantity to be measured is determined by the equation:

$$\Psi = \frac{E1_{min} - (t_{RX1} - t_{TX2})}{2},$$

where $E1_{min}$ is an estimate of the minimum value of said time difference, and $t_{TX2}$ and $t_{RX1}$, are the instant of transmission measured in said second area B and the instant of reception measured in said first area A for said second measurement message.

In the method according to an embodiment of the invention, said quantity to be measured is the transmission delay D between said first area and said second area, and said quantity to be measured is determined by the equation:

$$D = \frac{E1_{min} + E2_{min}}{2},$$

where $E1_{min}$ is an estimate of the minimum value of said time difference, and $E2_{min}$ is an estimate of the minimum value of said second time difference.

In the method according to an embodiment of the invention, said quantity to be measured is the phase difference Ψ between the clock times of said first area and said second area, and said quantity to be measured is determined by the equation:

$$\Psi = \frac{E1_{min} - E2_{min}}{2},$$

where $E1_{min}$ is an estimate of the minimum value of said time difference, and $E2_{min}$ is an estimate of the minimum value of said second time difference.

In the method according to an embodiment of the invention, the smallest of said values of the second time difference is selected, and the selected, smallest value of the second time difference is used as said estimate of the minimum value of the second time difference $E2_{min}$.

In the method according to an embodiment of the invention, said estimate of the minimum value of the second time difference $E2_{min}$ is calculated as follows:
  classifying said values of the second time difference into ranges of values having predetermined lower and upper limits,
  calculating for each range of values a second occurrence frequency indicator, which is proportional to the number of values of the second time difference that belong to said range of values,
  fitting a second curve to the occurrence frequency indicators of said ranges of values, and
  determining as said estimate of the minimum value of the second time difference $E2_{min}$ the value of said second time difference that corresponds to the zero point of said curve.

In the method according to an embodiment of the invention, the measurement messages are in the form of one of the alternatives: IP (Internet Protocol) packets, ATM (Asynchronous Transfer Mode) frames, Ethernet frames, MPLS (Multiprotocol Label Switching) frames, and Frame Relay frames.

In a method according to another embodiment of the invention, the measurement messages are bit sequences with a predetermined bit pattern.

The computer program according to an embodiment of the invention for determining a quantity to be measured from the communication system includes instructions that can be executed by a programmable processor:
  for instructing the programmable processor to calculate the values of time difference for the first measurement messages, which have been sent from the first area of said communication system to the second area of said communication system, the value of said time difference relating to each first measurement message being essentially the difference between the instant of reception measured in said second area and the instant of transmission measured in said first area for the measurement message in question,
  for instructing said programmable processor to classify said values of the time difference into ranges of values having predetermined lower and upper limits,
  for instructing said programmable processor to calculate for each range of values an occurrence frequency indicator (333, 334, 335 in FIGS. 3a ja 3b), which is proportional to the number of values of said time difference that belong to said range of values,
  for instructing said programmable processor to fit a curve (331 in FIGS. 3a ja 3b) to the occurrence frequency indicators of said ranges of values,
  for instructing said programmable processor to determine an estimate of the minimum value of said time difference on the basis of said curve, and
  for instructing said programmable processor to determine said quantity to be measured on the basis of an estimate of the minimum value of said time difference and information related to the second measurement message, which said second measurement message has been sent from said second area to said first area, and which information is based on the instant of transmission measured in said second area and the instant of reception measured in said first area for said second measurement message.

The computer program according to an embodiment of the invention is saved in a storage means readable by the processing unit, such as an optical disk (CD, Compact Disk).

The computer program according to an embodiment of the invention is encoded to a signal, which can be received from a communication network, such as the Internet.

As it is obvious to a person skilled in the art, the invention and its embodiments are not limited to the above examples of embodiments, but the invention and its embodiments can be modified within the scope of the independent claims. The expressions used in the claims that relate to the existence of the characteristic features, such as "the equipment includes a processor system" are open in such a way that presenting the characteristic features does not exclude the existence of other characteristic features that are not set forth in the independent claims.

What is claimed is:

1. Equipment for determining a quantity to be measured from a communication system, the equipment including a processor system arranged to:
  calculate values of time difference for first measurement messages, which have been transmitted from a first area of said communication system to a second area of said communication system, the value of the time difference relating to each first measurement message being essentially a difference between an instant of reception measured in said second area and an instant of transmission measured in said first area for the measurement message in question,
  classify said values of the time difference into ranges of values having predetermined lower and upper limits,
  calculate for each range of values an occurrence frequency indicator, which is proportional to the number of values of said time difference that belong to said range of values,
  fit a curve to the occurrence frequency indicators of said ranges of values,
  determine on the basis of said curve an estimate of the minimum value of said time difference, and
  determine said quantity to be measured on the basis of the estimate of the minimum value of said time difference and information related to a second measurement message, which said second measurement message has been sent from said second area to said first area, and which said information is based on an instant of transmission measured in said second area and an instant of reception measured in said first area for said second measurement message.

2. Equipment according to claim 1, wherein said processor system is arranged:
  to calculate values of second time difference for said second measurement message and at least one third measurement message, which have been transmitted from said second area to said first area, the value of said second time difference relating to each measurement message being essentially a difference between an instant of reception measured in the first area and an instant of transmission measured in said second area for the measurement message in question, to calculate an estimate of the minimum value of said second time difference on the basis of said values of the second time difference, and to determine said quantity to be measured on the basis of the estimate of the minimum value of said time difference and the estimate of the minimum value of said second time difference.

3. Equipment according to claim 2, wherein said quantity to be measured is a transmission delay D between said first area and said second area, and said processor system is arranged to determine said quantity to be measured by the equation:

$$D = \frac{E1_{min} + E2_{min}}{2},$$

where $E1_{min}$ is the estimate of the minimum value of said time difference, and $E2_{min}$ is the estimate of the minimum value of said second time difference.

4. Equipment according to claim 2, wherein said quantity to be measured is a phase difference $\Psi$ between clock times of said first area and said second area, and said processor system is arranged to determine said quantity to be measured by the equation:

$$\Psi = \frac{E1_{min} - E2_{min}}{2},$$

where $E1_{min}$ is the estimate of the minimum value of said time difference, and $E2_{min}$ is the estimate of the minimum value of said second time difference.

5. Equipment according to claim 2, wherein said processor system is arranged to select the smallest of said values of the second time difference and to use the selected smallest value of the second time difference as said estimate of the minimum value of the second time difference.

6. Equipment according to claim 2, wherein said processor system is arranged:
to classify said values of the second time difference into ranges of values having predetermined lower and upper limits,
to calculate for each range of values a second occurrence frequency indicator, which is proportional to the number of values of said second time difference that belong to said range of values,
to fit a second curve to the occurrence frequency indicators of said ranges of values, and
to determine on the basis of said second curve an estimate of the minimum value of said second time difference.

7. Equipment according to claim 1, wherein said quantity to be measured is a transmission delay D between said first area and said second area, and said processor system is arranged to determine said quantity to be measured by the equation:

$$D = \frac{E1_{min} + t_{RX1} - t_{TX2}}{2},$$

where $E1_{min}$ is the estimate of the minimum value of said time difference, and $t_{TX2}$ and $t_{RX1}$, are the instant of transmission measured in said second area and the instant of reception measured in said first area for said second measurement message.

8. Equipment according to claim 1, wherein said quantity to be measured is a phase difference $\Psi$ between clock times of said first area and said second area, and said processor system is arranged to determine said quantity to be measured by the equation:

$$\Psi = \frac{E1_{min} - (t_{RX1} - t_{TX2})}{2},$$

where $E1_{min}$ is the estimate of the minimum value of said time difference, and $t_{TX2}$ and $t_{RX1}$, are the instant of transmission measured in said second area and the instant of reception measured in said first area for said second measurement message.

9. Equipment according to claim 1, wherein said first measurement messages and said second measurement message comply with one of the following alternatives: IP (Internet Protocol) packages, ATM (Asynchronous Transfer Mode) frames, Ethernet frames, MPLS (Multiprotocol Label Switching) frames, and Frame Relay frames.

10. Equipment according to claim 1, wherein said first measurement messages and said second measurement message are bit sequences having a predetermined bit pattern.

11. Equipment according to claim 1, wherein said processor system is arranged to use a part of the graph of function F as said curve, the expression of the function F containing settable parameters, and the function F having the following properties:
there is a real number x0, by which said function F and the derivative F' of said function are both zeros, and the value of which depends on at least one of said settable parameters, and
there is a real number x1>x0, by which said derivative F' and the second derivative F'' of said function are both positive in an open range from x0 to x1, and
said processor system is arranged to determine the values of said settable parameters on the basis of the occurrence frequency indicators of said ranges of values and to set said x0 as said estimate of the minimum value of the time difference.

12. A network element comprising:
a transmitter for transmitting digital data to a communication system,
a receiver for receiving digital data from said communication system, and
equipment for determining a quantity to be measured from said communication system, the equipment including a processor system arranged to:
calculate values of time difference for first measurement messages, which have been transmitted from a first area of said communication system to a second area of said communication system, the value of the time difference relating to each first measurement message being essentially a difference between an instant of reception measured in said second area and an instant of transmission measured in said first area for the measurement message in question,
classify said values of the time difference into ranges of values having predetermined lower and upper limits, calculate for each range of values an occurrence frequency indicator, which is proportional to the number of values of said time difference that belong to said range of values, fit a curve to the occurrence frequency indicators of said ranges of values, determine on the basis of said curve an estimate of the minimum value of said time difference, and determine said quantity to be measured on the basis of the estimate of the minimum value of said time difference and information related to a second measurement message, which said second measurement message has been sent from said second area to said first area, and which said information is based on an instant of transmission measured in said second area and an instant of reception measured in said first area for said second measurement message.

13. A network element according to claim 12, wherein said transmitter is arranged to transmit data transmission frames to said communication system, said receiver is arranged to receive data transmission frames from said communication system, and said network element is arranged to read the instant of transmission of the data transmission frame from the received data transmission frame.

14. A network element according to claim 13, wherein the network element is at least one of the following: IP (Internet Protocol) router, MPLS (Multiprotocol Label Switching) switch, ATM (Asynchronous Transfer Mode) switch and Ethernet switch.

15. A network element according to claim 12, wherein said network element includes an adjustment unit, which is arranged to adjust a clockwork in the network element on the basis of the quantity to be measured.

16. A method for determining a quantity to be measured from a communication system, the method comprising:

transmitting first measurement messages from a first area of said communication system to a second area of said communication system, sending a second measurement message from said second area to said first area, calculating values of time difference for the first measurement messages, the value of said time difference related to each first measurement being essentially a difference between an instant of reception measured in said second area and an instant of transmission measured in said first area for the measurement message in question, classifying said values of the time difference into ranges of values having predetermined lower and upper limits, calculating for each range of values an occurrence frequency indicator, which is proportional to the number of values of said time difference that belong to said range of values, fitting a curve to the occurrence frequency indicators of said ranges of values, determining on the basis of said curve an estimate of the minimum value of said time difference, and determining said measurable quantity on the basis of the estimate of the minimum value of said time difference and the information related to said second measurement message, said information being based on an instant of transmission measured in said second region and an instant of reception measured in said first region for said second measurement message.

17. A method according to claim 16, wherein the method comprises:

sending at least one third measurement message from said second area to said first area, calculating values of second time difference for said second measurement message and said at least one third measurement message, the value of said second time difference related to each measurement message being essentially a difference between an instant of reception measured in the first area and an instant of transmission measured in said second area for the measurement message in question, calculating an estimate of the minimum value of said second time difference on the basis of said values of the second time difference, and determining said quantity to be measured on the basis of the estimate of the minimum value of said time difference and the estimate of the minimum value of said second time difference.

18. A method according to claim 17, wherein said quantity to be measured is a transmission delay D between said first area and said second area, and said quantity to be measured is determined by the equation:

$$D = \frac{E1_{min} + E2_{min}}{2},$$

where $E1_{min}$ is the estimate of the minimum value of said time difference, and $E2_{min}$ is the estimate of the minimum value of said second time difference.

19. A method according to claim 17, wherein said quantity to be measured is a phase difference $\Psi$ between clock times of said first area and said second area, and said quantity to be measured is determined by the equation:

$$\Psi = \frac{E1_{min} - E2_{min}}{2},$$

where $E1_{min}$ is the estimate of the minimum value of said time difference, and $E2_{min}$ is the estimate of the minimum value of said second time difference.

20. A method according to claim 17, wherein the smallest of said values of the second time difference is selected, and the selected smallest value of the second time difference is used as said estimate of the minimum value of the second time difference.

21. A method according to claim 17, wherein the method comprises:

classifying said values of the second time difference into ranges of values having predetermined lower and upper limits, calculating for each range of values a second occurrence frequency indicator, which is proportional to the number of values of the second time difference that belong to said range of values, fitting a second curve to the occurrence frequency indicators of said ranges of values, and determining on the basis of said second curve an estimate of the minimum value of said second time difference.

22. A method according to claim 16, wherein said quantity to be measured is a transmission delay D between said first area and said second area, and said quantity to be measured is determined by the equation:

$$D = \frac{E1_{min} + t_{RX1} - t_{TX2}}{2},$$

where $E1_{min}$ is the estimate of the minimum value of said time difference, and $t_{TX2}$ and $t_{RX1}$, are the instant of transmission measured in said second area and the instant of reception measured in said first area for said second measurement message.

23. A method according to claim 16, wherein said quantity to be measured is a phase difference $\Psi$ between clock times of said first area and said second area, and said quantity to be measured is determined by the equation:

$$\Psi = \frac{E1_{min} - (t_{RX1} - t_{TX2})}{2},$$

where $E1_{min}$ is the estimate of the minimum value of said time difference, and $t_{TX2}$ and $t_{RX1}$ are the instant of transmission measured in said second area and the instant of reception measured in said first area for said second measurement message.

24. A method according to claim 16, wherein said first measurement messages and said second measurement message comply with one of the following alternatives: IP (Internet Protocol) packages, ATM (Asynchronous Transfer mode) packages, Ethernet frames, MPLS (Multiprotocol Label Switching) frames and Frame Relay frames.

25. A method according to claim 16, wherein said first measurement messages and said second measurement message are bit sequences having a predetermined bit pattern.

26. A method according to claim 16, wherein said curve is a part of the graph of function F, the expression of which function F contains settable parameters, and the function F has the following properties:

there is a real number x0, by which said function F and the derivative F' of said function are both zeros, and the value of which depends on at least one of said settable parameters, and there is a real number x1>x0, by which said derivative F' and the second derivative F" of said function are both positive in an open range from x0 to x1, and the method comprises determining the values of said settable parameters on the basis of the occurrence frequency indicators of said ranges of values and setting said x0 as said estimate of the minimum value of the time difference.

27. A non-transitory computer readable medium storing a computer program for determining a quantity to be measured from a communication system, the computer program including instructions executable by a programmable processor for directing said programmable processor to:

calculate values of time difference for first measurement messages, which have been transmitted from a first area of said communication system to a second area of said communication system, the value of said time difference related to each first measurement message being essentially a difference between an instant of reception measured in said second area and an instant of transmission measured in said first area for the measurement message in question, classify said values of the time difference into ranges of values having predetermined lower and upper limits, calculate for each range of values an occurrence frequency indicator, which is proportional to the number of values of said time difference that belong to said range of values, fit a curve to the occurrence frequency indicators of said ranges of values, determine an estimate of the minimum value of said time difference on the basis of said curve, and determine said quantity to be measured on the basis of the estimate of the minimum value of said time difference and information related to a second measurement message, which said second measurement message has been sent from said second area to said first area, and which said information is based on an instant of transmission measured in said second area and an instant of reception measured in said first area for said second measurement message.

* * * * *